(12) United States Patent
Gettya

(10) Patent No.: US 10,223,474 B1
(45) Date of Patent: Mar. 5, 2019

(54) TRAVERSING A CYCLIC GRAPH USING A MODIFIED BREADTH-FIRST SEARCH IN COMPLEX MODELING

(71) Applicant: Alight LLC, Los Altos, CA (US)

(72) Inventor: Yuriy Gettya, Olathe, KS (US)

(73) Assignee: Riivos, Inc., San Francisco, CA (US)

( * ) Notice: Subject to any disclaimer, the term of this patent is extended or adjusted under 35 U.S.C. 154(b) by 300 days.

(21) Appl. No.: 14/872,101

(22) Filed: Sep. 30, 2015

(51) Int. Cl.
*G06F 17/30* (2006.01)

(52) U.S. Cl.
CPC .. *G06F 17/30958* (2013.01); *G06F 17/30507* (2013.01)

(58) Field of Classification Search
CPC .................. G06F 17/30958; G06F 17/30507
See application file for complete search history.

(56) References Cited

U.S. PATENT DOCUMENTS

| | | | |
|---|---|---|---|
| 5,634,113 | A | 5/1997 | Rusterholz |
| 5,938,760 | A | 8/1999 | Levine et al. |
| 6,067,644 | A | 5/2000 | Levine et al. |
| 7,660,705 | B1 | 2/2010 | Meek et al. |
| 7,814,427 | B2 | 10/2010 | Cook et al. |
| 7,831,526 | B1 | 11/2010 | Crawford et al. |
| 9,342,510 | B1 | 5/2016 | Mohr et al. |
| 2004/0002891 | A1 | 1/2004 | Chen et al. |
| 2005/0114802 | A1 | 5/2005 | Beringer et al. |
| 2005/0216482 | A1 | 9/2005 | Ponessa |
| 2005/0257193 | A1 | 11/2005 | Falk et al. |
| 2007/0234018 | A1 | 10/2007 | Feiste |
| 2008/0077856 | A1 | 3/2008 | Gazzillo |
| 2008/0276209 | A1 | 11/2008 | Albrecht et al. |
| 2009/0288059 | A1 | 11/2009 | Dimou et al. |
| 2014/0143110 | A1 | 5/2014 | Qin et al. |
| 2017/0262276 | A1 | 9/2017 | Zongker |

OTHER PUBLICATIONS

U.S. Appl. No. 15/134,359, filed Apr. 20, 2016.
U.S. Appl. No. 14/872,110, filed Sep. 30, 2015.
U.S. Appl. No. 15/134,363, filed Apr. 20, 2016.
U.S. Appl. No. 14/872,130, filed Sep. 30, 2015.
U.S. Appl. No. 14/871,771, filed Sep. 30, 2015.
U.S. Appl. No. 14/875,119, filed Sep. 30, 2015.
Jourdan et al, "Static Timing Analysis of Real-Time Systems," ACM SIGPLAN Notices, 30(11):79-87, Nov. 1995.
Reichert et al., "Dealing with forward and backward jumps in workflow management systems," Software and Systems Modeling, 2(1)37-58, Mar. 2003.

*Primary Examiner* — Jay A Morrison
(74) *Attorney, Agent, or Firm* — Davis Wright Tremaine LLP; Philip H. Albert

(57) ABSTRACT

A method determines an order of calculation for one or more of a set of variables in the complex system, so that the calculation order is substantially optimal for avoiding having to skip calculations due to lack of precursors. The method reviews the complex model and orders calculations in a list, so that variables depending on precursors are ordered later, so that their calculation need not be skipped. The method determines a threshold (which can be a single pass), and when the threshold is exceeded, reorders the calculation, so that optimality of calculation can be improved. The method can reorder the calculation so that the new order of calculation is substantially a reverse of the original.

14 Claims, 5 Drawing Sheets

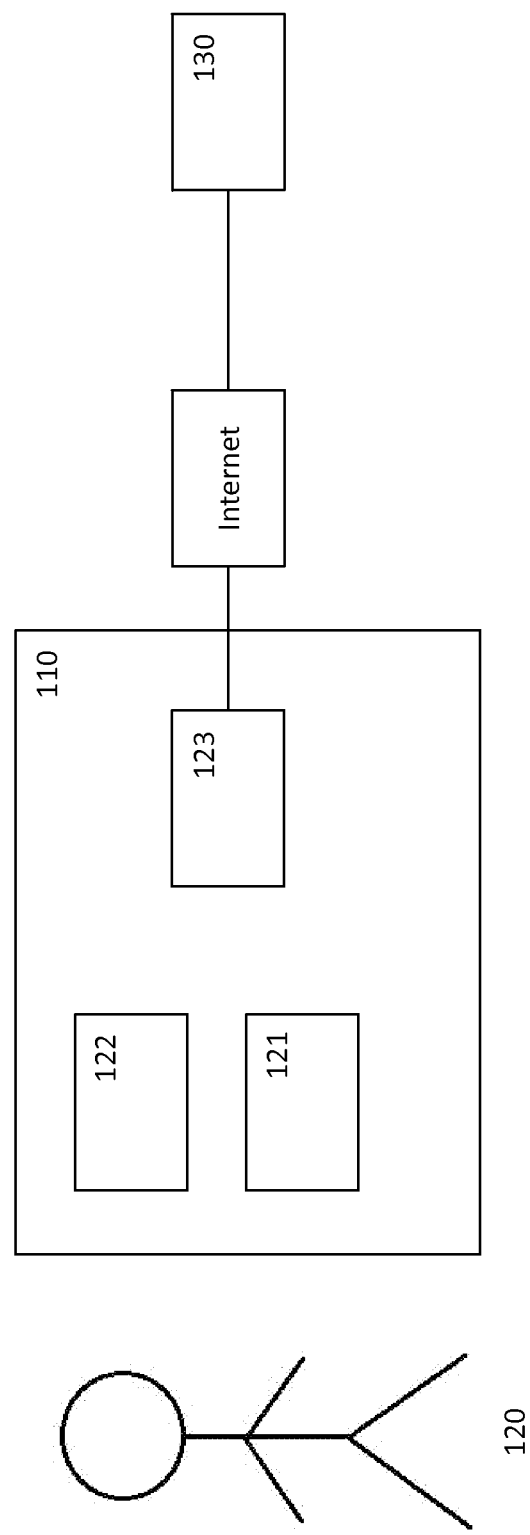

Method 212

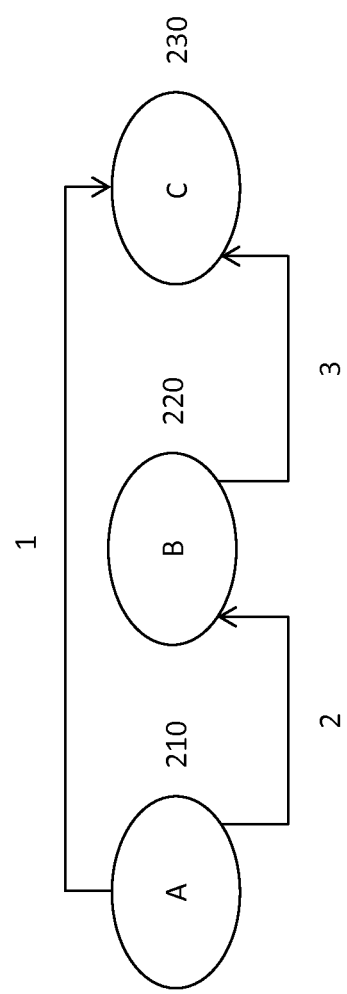

TRAVERSING A CYCLIC GRAPH USING A MODIFIED BREADTH-FIRST SEARCH IN COMPLEX MODELING

RELATED DOCUMENTS

This Application describes technologies that can be used with inventions and other technologies, described in one or more of the following co-pending applications, filed on the same day, and assigned to the same assignee.

This Application relates to devices, methods, and techniques, such as described in the following documents, and documents quoted therein or related thereto:

- U.S. Provisional Application Ser. No. 62/057,247; filed Sep. 30, 2014, in the name of inventor C. Lee HARRIS; titled "Generating and using a cyclic graph to calculate solutions in complex modeling," (hereinafter "Harris I");
- U.S. Provisional Application Ser. No. 62/057,239; filed Sep. 30, 2014, in the name of inventor Yuriy GETTYA; titled "Traversing a 1 cyclic graph using a modified breadth-first search in complex modeling,";
- U.S. Provisional Application Ser. No. 62/057,243; filed Sep. 30, 2014, in the name of inventors Le NGUYEN and C. Lee HARRIS; titled "Dynamic sequencing node traversals and calculating values in complex modeling solutions,";
- U.S. Provisional Application Ser. No. 62/057,241; filed Sep. 30, 2014, in the name of inventor Le NGUYEN, titled "Minimizing redundant calculations in complex modeling solutions when only independent input values change,";
- U.S. Provisional Application Ser. No. 62/057,245; filed Sep. 30, 2014, in the name of inventor April GRAVES and C. Lee HARRIS; titled "Injecting dynamic highly-customized runtime features into a complex modeling solution while maintaining time-relative dynamic evolutions of the solution's structure using inheritance and overriding of calculation methods,";
- U.S. application Ser. No. 14/871,771; filed Sep. 30, 2015; in the name of inventor C. Lee HARRIS; titled "Generating and using a cyclic graph to calculate solutions in complex modeling,";
- U.S. application Ser. No. 14/872,101; filed Sep. 30, 2015; in the name of inventor Yuriy GETTYA; titled "Traversing a cyclic graph using a modified breadth-first search in complex modeling,";
- U.S. application Ser. No. 14/872,110; filed Sep. 30, 2015; in the name of inventors Le NGUYEN and C. Lee HARRIS; titled "Dynamic sequencing node traversals and calculating values in complex modeling solutions,";
- US Provisional Application Ser. 14/872,119; filed Sep. 30, 2015; in the name of inventor Le NGUYEN, titled "Minimizing redundant calculations in complex modeling solutions when only independent input values change,";
- US Provisional Application Ser. 14/872,130; filed Sep. 30, 2015; in the name of inventor April GRAVES and C. Lee HARRIS; titled "Injecting dynamic highly-customized runtime features into a complex modeling solution while maintaining time-relative dynamic evolutions of the solution's structure using inheritance and overriding of calculation methods,".

Each and every one of these documents, as well as all documents cited therein, is hereby incorporated by reference as if fully recited herein.

This Application claims priority of each and every one of these documents, as well as to all documents incorporated therein, to the fullest extent possible.

BACKGROUND

Field of the Disclosure

This application relates to traversing a cyclic graph using a modified breadth-first search in complex modeling, and other matters.

For example, this application includes information relating to selecting an initial order of calculation, such that the initial ordering of calculation is a reasonably order of calculation, with the effect that in many cases (at least some cases, and likely in most cases) the initial order of calculation is adequate to perform the set of calculations in a reasonable amount of time.

Other and further possibilities are described herein.

Related Art

One problem that has arisen, particularly in the fields of complex modeling, and particularly in the many and various fields of complex predictive modeling, optimization, and solving, is that a complex model can yield a substantial amount of computation. Moreover, the substantial amount of computation can be in response to a relatively large number of rules for computation or decision-making. These relatively large number of rules can produce a relatively substantial probability that computation is poorly ordered, with the effect that any particular ordering of calculation might involve repeated sequencing through a list of nodes whose values are to be calculated.

In one possibility, the model of the complex system could be examined to determine an optimal order for calculation, or at least an order for calculation that is close to optimal. While this method can generally have the effect that the order for calculation does not generally involve multiple sequencing to determine an order for calculation, it can have the effect that many nodes are examined only to determine that they cannot yet be calculated.

First, a relatively large (or even a medium-large) complex system can involve substantial review, just to determine an order for calculation that is close to optimal. It is likely that the amount of review to determine an order for calculation that is close to optimal can be close to exponential in the size of the complex system. This can have the effect that a complex system with hundreds of thousands of nodes or links, or even millions of nodes or links, could involve much more review to determine an order for calculation that is close to optimal than would be involved by simply using a non-optimal order.

Second, a substantial number of complex systems can include cycles, loops, or other features that involve calculation that cannot be performed without breaking the loop at some point and conducting the calculation from that point. It might occur that the loop can be broken because the complex system loops at a point where one time period depends on the results of a former time period. One example could be a complex system in which each month depends on the next-earlier month; however, this type of loop is substantially illusory because it can be broken at year boundaries. Alternatively, it might occur that the loop cannot be conveniently broken, and some technique for approximating the calculation, or arbitrarily breaking the loop might be valuable.

Third, it might occur with some complex systems that a relatively optimal order for calculation can change with circumstance. Some such circumstances can include (1) the complex system itself changes, such as when parameters of the complex system, rules linking values or variables, or other factors, can change while calculation is being conducted; (2) successful calculation of some values or variables can substantially change the optimal order for calculation; or (3) other factors or features of the complex system.

SOME DRAWBACKS OF THE KNOWN ART

Each of these issues, as well as other possible considerations, might cause difficulty in aspects of effective and efficient calculation of values and variables in complex systems, particularly relatively large complex systems with relatively large numbers of values or variables, relatively large numbers of rules coupling those values or variables, or otherwise. The particular choice of an order of calculation can be associated with a decision under uncertainty that, if erroneous, increases the calculation cost, and lessens the effectiveness of, the complex system.

BRIEF SUMMARY

This Application

This Application provides patentable subject matter that can ameliorate at least some of the problems described above, as well as others.

While this Application is primarily directed to operations on a complex system model, the subject matter described in this Application can be used to control automatic equipment, or to assist operators in so doing. For example, when the system is coupled to a refinery, information gleaned from the refinery can be input to a system model tailored to the operation of a refinery, and output from the system model can assist in driving operations of the refinery.

A system includes apparatus, in response to a representation of a complex model (such as a complex predictive model, a complex model of a physical system, a complex model of a financial system, a complex model of a social system, or otherwise), that can perform a method, the method capable of determining an order of calculation for one or more of a set of values or variables in the complex system, with the effect that the order of calculation is substantially optimal with respect to avoiding having to skip calculation of values or variables, due to lack of precursor values or variables.

In one embodiment, the method reviews the complex model and orders one or more calculations in a list of values or variables to be calculated, with the effect that values or variables whose calculation depends on precursors are ordered later, with the effect that the order of calculations is optimal or nearly optimal.

For example, this application includes information relating to selecting an initial order of calculation, such that the initial ordering of calculation is a reasonable order of calculation, with the effect that in many cases (at least some cases, and likely in most cases) the initial order of calculation is adequate to perform the set of calculations in a reasonable amount of time. In one embodiment, the precursor values or variables for each value or variable is disposed with the effect that each one of those values or variables has the greatest likelihood to be calculable at the time it is reached.

This Application

After reading this application, those skilled in the art would recognize that techniques shown in this application are applicable to more than just the specific embodiments shown herein.

For example, the applicability of the techniques shown herein can broadly encompass a wide variety of complex systems, and models thereof. These complex systems can include physical systems, such as chemical refineries or rubber-curing devices; financial systems, such as business predictive models involving decision under uncertainty; signal-processing systems, such as EKG measurement or predictive systems, or such as computing techniques, such as relatively rapid multiplication or factoring of large numbers.

Similarly, the applicability of the techniques shown herein can broadly encompass a wide variety of models for complex systems, including feedback and feedforward modeling; machine learning techniques, such as simulated annealing or quantum annealing; and parallel computing techniques, such as Navier-Stokes relaxation, supply-and-demand curve responses to changes in taxes or transaction costs; and otherwise.

Possible Applicability

After reading this Application, those skilled in the art would recognize that techniques shown herein are applicable to more than just the specific embodiments shown herein, are within the scope and spirit of the invention, and would not require undue experiment or further invention.

Other and further techniques, also shown or suggested by this Application, are also applicable to more than just the specific embodiments described herein.

BRIEF DESCRIPTION OF THE DRAWINGS

FIG. 1 (collectively including FIGS. 1A-1B) shows a conceptual drawing of a system.

FIG. 1A shows a conceptual drawing of an example system.

FIG. 2 (collectively including FIGS. 2A-2C) shows a conceptual drawing of a method.

FIG. 2C shows a conceptual drawing of a third method.

DETAILED DESCRIPTION OF AN EMBODIMENT

Terminology

Generality of the Description

Figure 1B:
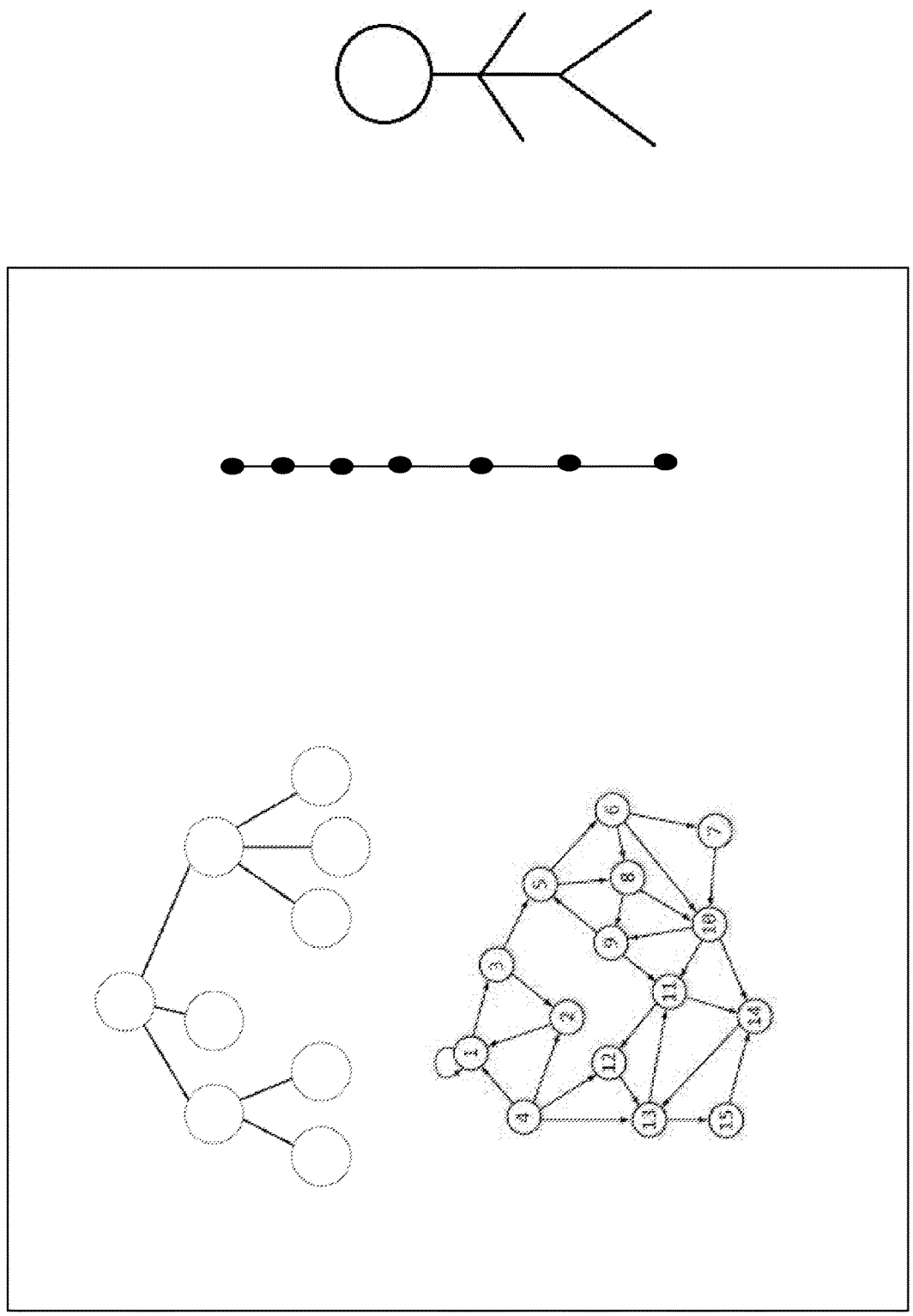
FIG. 1B shows a conceptual drawing of a user interface associated with a system.

Ideas and technologies shown or suggested by this Application should be thought of in their most general form, including without limitation, considering one or more of the following:

The phrases and terms "Application," "this Application," "this Disclosure," and variants thereof, generally refer to this Specification, Drawings, Figures, and Claims, all other parts of this Application, and all facts known in the art at the time of filing, and all facts that can be rationally concluded therefrom.

The phrases and terms "in one example," "in one embodiment," "in one implementation," "in one scenario," "in possible examples," "in possible embodiments," "in possible implementations," "in possible scenario," and variants thereof, generally refer that a particular characteristic, feature, or structure, described herein is included in at least one embodiment of the invention. Multiple uses of this phrase do not necessarily all refer to the same embodiment. Rather, the specific particular characteristic, feature, or structure, described herein might be combined in any suitable manner into one or more distinct possible embodiments.

When an apparatus element or a method step is said to "include" or "perform," and variants thereof, or otherwise be restricted in some way, this Application should be read that the subpart of the apparatus element, or the sub-step of the method, and the restriction mentioned, is only optional, not required. After reading this Application, those skilled in the art would recognize that those apparatus elements or method steps need not necessarily include or perform those particular subparts or sub-steps. In the context of the invention, no such particular subparts or sub-steps are particularly required. In an alternative embodiment, apparatus elements or method steps without those sub-parts or sub-steps would be workable, are within the scope and spirit of the invention, and would not require undue experiment or further invention.

The phrases and terms "perform," and variants thereof, generally refer (in the context of a program of instructions) any one or more means by which those instructions are executed or interpreted, or a device (such as a computing device) otherwise conducts the process indicated by that program of instructions. A program of instructions can be detected or interpreted at one location, and executed or its process conducted at another location. A program of instructions can be performed by a portion of a device, rather than the entire device, or by one or more devices, or by one or more portions of devices (the same device or different devices). A program of instructions can be performed by an emulated device, such as a virtual machine, "sandbox" environment, or otherwise. A program of instructions can be performed in part, halted or paused or stopped, transferred to another device, in whole or in part, and possibly continued.

The phrases and terms "relatively," and variants thereof, generally refer any relationship in which a comparison is possible, including without limitation "relatively less," "relatively more," and otherwise. In the context of the invention, where a measure or value is indicated to have a relationship "relatively," that relationship need not be precise, need not be well-defined, and need not be by comparison with any particular or specific other measure or value. For one example, whenever a measure or value is "relatively increased" or "relatively more," that comparison need not be with respect to any known measure or value, but might be with respect to a measure or value held by that measurement or value at another place or time, or with respect to a measure or value commonly used in the art.

The phrases and terms "substantially," and variants thereof, generally refer any circumstance in which a determination, measure, value, or otherwise; is equal, equivalent, nearly equal, nearly equivalent, or approximately; what the measure or value is recited to be. For example, the phrases and terms "substantially all," and variants thereof, generally refer any circumstance in which all, except possibly a relatively minor amount or number, have the stated property. For example, the phrases and terms "substantially none," and variants thereof, generally refer any circumstance in which none, except possibly a relatively minor amount or number, have the stated property. For example, the phrases and terms "substantial effect," and variants thereof, generally refer any circumstance in which an effect might be detected or determined.

The phrases and terms "techniques," and variants thereof, generally refer any material suitable for description, including without limitation all such material within the scope of patentable subject matter. Whenever a method step is described, those skilled in the art would know, without further invention or undue experiment, that this application thereby also describes (1) at least a first product, such as one maintaining instructions that are interpretable by a computing device, where those instructions direct one or more devices to perform that method step; and (2) at least a second product, such as one capable of performing that method step.

After reading this application, those skilled in the art would realize that the invention is not in any way limited to the specifics of any particular example. Many other variations are possible that remain within the content, scope and spirit of the invention, and these variations would be clear to those skilled in the art, without further invention or undue experiment.

Specific Phrases and Terms

One or more of the following phrases and terms can be used in this Application. Where clear from the context, they can have the meanings described herein. After reading this Application, those skilled in the art would recognize that these phrases and terms can have other, broader and further, meanings as well or instead.

In one embodiment, the invention can include a financial planning technique, which can include at least some of the text described herein. After reading this application, those skilled in the art would recognize that other phrases or terms could be applicable to embodiments of the invention, and could be used to refer to elements similar to those described herein. For example, as described above, the system could be used as an alarm system or as a controller for a physical system, such as a chemical refinery, an internet router, a pacemaker, a pharmaceutical manufacture, a signal-processing system, a steel mill, or otherwise.

As described herein, a financial planning technique can include a set of nodes disposed in a tree-structure, or a directed graph structure, in which one or more leaf nodes can include values or variables that are input to the financial planning technique, and nodes higher in the tree structure or directed graph structure can include elements whose values are responsive to the values or variables that depend from them in the tree structure or directed graph structure. In a figure shown below (1B), an example of a tree structure or directed graph structure can be shown in a left-most pane, with leaf elements disposed near the bottom and elements dependent therefrom disposed substantially above those leaf elements.

In one embodiment, phrases and terms such as the following can be used in describing a nature of the tree structure or directed graph structure in a financial planning technique. In other embodiments, such as techniques more directed to values associated with physical elements, information or signal processing, or computing techniques, similar terms might be used to describe related elements, or distinct terms might be used to describe different elements.

Ideas and technologies shown or suggested by, or specific to, this Application should be thought of in their most general form, including without limitation, considering one or more of the following:

FinancialItem: an entity with a unique identity, zero or more identifying attributes, a set of numerical values, and Rules which is part of a set of such items comprising a FinancialApplication.

Hierarchy: The set of all FinancialItems are organized into a hierarchy such that each FinancialItem can be identified by its position in the hierarchy.

Rule: a specification of how a value should be calculated from other values. Example rules are 'units' time 'rate' equals 'amount', or 'accumulate all the values up to a specific point in time', or 'aggregate all the FinancialItems comprising a particular grouping under another FinancialItem'.

Model: The set of all FinancialItems each comprising a set of numerical values or the ArithmeticRules from which numerical values can be derived, the whole creating a FinancialApplication. Thus, a "Model" is substantially equivalent to a "FinancialApplication."

AggregationItem: A FinancialItem whose values are calculated by aggregating corresponding values from the FinancialItems immediately below it in the Hierarchy.

LineItem: A FinancialItem which is not an AggregationItem.

WorkSheet: The first level below the root of the Hierarchy and all descendant FinancialItems.

Analysis: A Worksheet whose AggregationItems are not Drivers.

FinancialStatement: One of three specific WorkSheets generated automatically by the system, comprising the standard financial statements of Profit and Loss statement, the Balance Sheet, and the Cash Flow statement.

TimePeriod: the smallest unit of time for which data values can be stored for a FinancialItem. Typically a calendar month, but can be any other length of time.

PlanTimePeriod: values corresponding to original or future values.

ActualTimePeriod: values of, or derived from, financial events which have actually occurred, e.g. a sale of 10 units of a product at a price of $20/unit, for a total value of $200.

TargetValue: values representing specific financial objectives the application is designed to help achieve.

RootValue: a quantity, percentage, or value with a specific numerical value, i.e. it is known and not derived from any other value in the model.

DerivedValue: a quantity, percentage, or value determined at least in part from RootValues or other DerivedValues.

Driver: a FinancialItem which, according to the Rules, is used to calculate another value.

EffectiveActuals: an integer number specifying how many ActualTimePeriods should be considered when calculating DerivedValues. For example, when "ActualTimePeriods" denote months, an "EffectiveActuals" value of 12 would denote a year.

{URAUnit, URARate, URAAmount}, also sometimes referred to as {Unit, Rate, Amount}: the triplet of values associated with a particular FinancialItem, for a particular PlanTimePeriod, ActualTimePeriod, or TargetValue, for a particular Scenario. It is possible for any one or more of these values to be null, that is, to not yet have any value.

Scenario: A named set of RootValues and DerivedValues derived directly and indirectly from the set of RootValues, according to the calculation rules of the Model.

CalcNode: an in-memory object corresponding to the set of values for all the TimePeriods in an application for PlanTimePeriod, or an ActualTimePeriod, or a TargetValue, for one of Unit, Rate, or Amount, for a particular Scenario. Every CalcNode contains a DriverList and a DependentsList.

RootNode: a CalcNode for a set of RootValues.

DriverList: every CalcNode contains a list of other CalcNodes which provide values needed to compute the values in the CalcNode, according to the CalcNode's Rule.

DependentList: every CalcNode contains a list of the CalcNodes which depend on its values.

LinkType: a enumeration indicating which of {PlanTimePeriod, ActualTimePeriod, TargetValue}, and {Unit, Rate, Amount} a CalcNode represents.

CircularChain: a list of CalcNodes which loops back on itself, that is, a sequence of CalcNodes linked via either DriverList or DependentList entries, such that by following such entries, the original CalcNode will be encountered. A CircularChain may be either an "Apparent CircularChain" or a "Real CircularChain".

Apparent CircularChain: a CircularChain is Apparent if the list is circular, but when values are actually computed, the presence of PeriodOffset calculations prevents any calculation from actually being dependent on the same, specific value. For example, if a calculation is being made from the same FinancialItem, if that FinancialItem is a January value that is being calculated based on a December value, a real circularity does not exist, at least because a January 2014 value would almost certainly be calculated based on the December 2013 value, not the December 2014 value.

Real CircularChain: a CircularChain is Real if the calculation of a value for a specific period depends on itself, no matter how many intervening values are calculated. This has the effect that a "Real CircularChain" represents a true feedback/feedforward dependency, loop, or self dependency.

RootList: the list of all CalcNodes which identify RootValues.

Any terms appearing in the figures but not explicitly described in this Application should be apparent to those skilled in the art.

After reading this application, those skilled in the art would realize that the invention is not in any way limited to the specifics of any particular example. Many other variations are possible that remain within the content, scope and spirit of the invention, and these variations would be clear to those skilled in the art, without further invention or undue experiment.

Figures and Text

FIG. 1 (collectively including FIGS. 1A-1B) shows a conceptual drawing of a system.

FIG. 1A shows a conceptual drawing of an example system.

FIG. 1B shows a conceptual drawing of a user interface associated with a system.

Figure 2A:
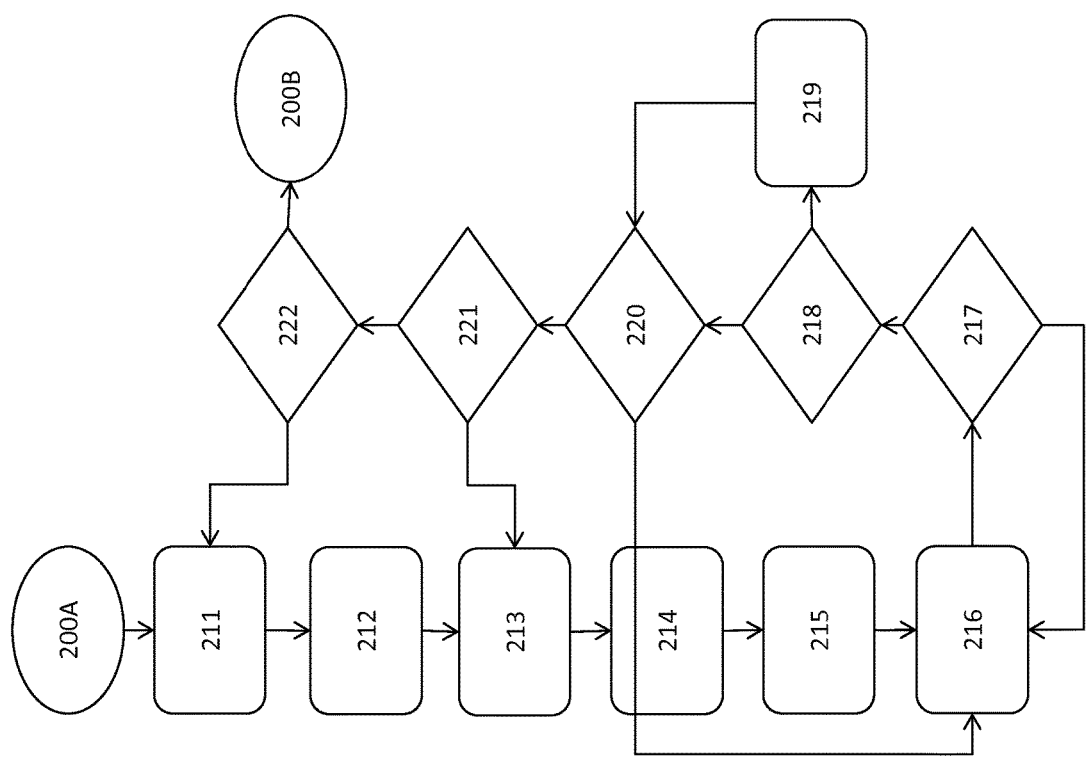
FIG. 2A shows a conceptual drawing of a first method.
Figure 2B:
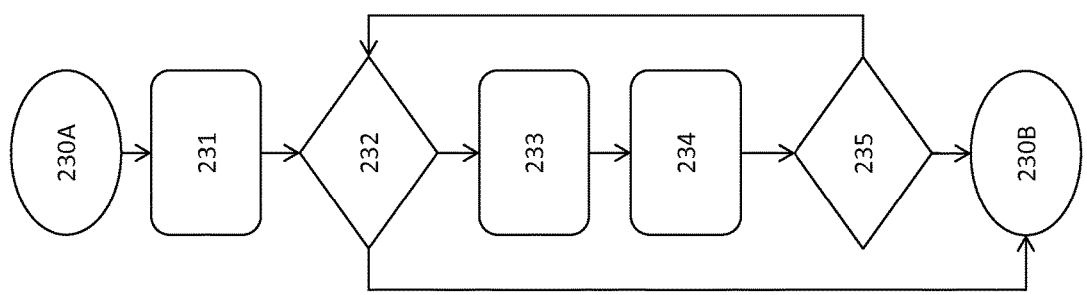
FIG. 2B shows a conceptual drawing of a second method.

FIG. 2 (collectively including FIGS. 2A-2C) shows a conceptual drawing of a method.

FIG. 2A shows a conceptual drawing of a first method.

FIG. 2B shows a conceptual drawing of a second method.

FIG. 2C shows a conceptual drawing of a third method.

System Elements

FIG. 1

FIG. 1 (collectively including FIGS. 1A-1B) shows a conceptual drawing of a system.

In possible implementations, a system 100 can include elements described herein, other elements shown in the figure, and possibly other elements. Not all elements are required. Elements should be considered optional, unless otherwise specified or unless clearly obvious for operation of the system. Elements may also be embodied in one or more devices, not necessarily in only a single device.

FIG. 1A

FIG. 1A shows a conceptual drawing of an example system.

A system 100 includes elements described herein, other elements shown in the figure, and possibly other elements.

The system 100 can include a user interface (UI) 110, suitably disposed to interact with a user 120 (such as an operator), such as by receiving requests from the user 120, and providing responses to the user 120 in response to those requests. For example, the system 100 can include a set of input devices 121 (such as a keyboard or a pointing device), a set of output devices 122 (such as a display screen or a speaker), and a computing device 123. The computing device 123 can be disposed relatively locally (such as in a desktop or laptop computer), or can be disposed relatively remotely (such as across a communication channel such as the Internet). The computing device 123 can be any device capable of performing the functions described herein, such as a desktop or laptop computer, a smartphone, a tablet or phablet device of whatever size, a wearable computing device (such as "Google Glass" or an "iWatch"), or combinations or conjunctions thereof.

In one embodiment, the system 100 can include a database 130, or other data maintenance or data storage element, capable of maintaining a representation of a complex model of a system. For example, the complex model can include a set of nodes (each representing a value or variable, or representing a rule associating values or variables).

In a first such case, a rule can include a representation of a technique for calculating one or more output values or variables in response to one or more input values or variables;

In a second such case, a rule can include a representation of a technique for comparing one or more input values or variables with a threshold value or variable;

In a third such case, a rule can include a representation of a technique for conditionally performing an operation, such as with respect to an IF-THEN-ELSE operation; or otherwise.

In one embodiment, the complex model can include relatively many such nodes (such as tens of thousands, hundreds of thousands, or millions of such nodes). The complex model can also include techniques for accessing and aggregating information from a database, such as a dynamically updated set of data. Examples can include population density, sales data, stock market data, weather data, or otherwise.

FIG. 1B

FIG. 1B shows a conceptual drawing of a user interface associated with a system.

In one embodiment, the user interface (UI) 110 can include a display of each such node, together with directed links showing a direction of causation of changes in values or variables from input to output. The user interface 110 can also include a set of aggregated nodes, such as a collection of nodes in which the collection itself is presented to the user 120 together with directed links showing causation of changes from a first collection to a second collection. This has the effect that the user 120 can zoom in for a more detailed view of the complex model, or zoom out for a more global view of the complex model.

Method of Operation

While the ideas and techniques described herein primarily relate to financial planning models, in the context of the invention, there is no particular requirement for any such limitation. For example, the ideas and techniques described herein can be applied in the following other circumstances. For example, the applicability of the techniques shown herein can broadly encompass a wide variety of complex systems, and models thereof. These complex systems can include physical systems, such as chemical refineries or rubber-curing devices; financial systems, such as business predictive models involving decision under uncertainty; signal-processing systems, such as EKG measurement or predictive systems, or such as computing techniques, such as relatively rapid multiplication or factoring of large numbers.

FIG. 2

FIG. 2 (collectively including FIGS. 2A-2C) shows a conceptual drawing of a method.

In possible implementations, a method 200 includes flow points and method steps as described herein, other elements shown in the figure, and possibly other elements. Not all flow points or method steps are required. Flow points or method steps should be considered optional, unless otherwise specified or unless clearly obvious for operation of the system.

The system 100, or portions of the system 100, can or be used while performing the method 200, or portions of the method 200. Where described herein that a flow point is reached, or a step is performed, by the method 200, it should be understood from the context, or from the figure, which portions (or all of them) of the system 100, reaches the flow point or takes the actions to perform the step.

These flow points and method steps are, by the nature of the written word, described in one particular order. This description does not limit the method to this particular order. The flow points and method steps might be performed in a different order, or concurrently, or partially concurrently, or otherwise in a parallel, pipelined, quasi-parallel, or other manner. They might be performed in part, paused, and returned to for completion. They might be performed as co-routines or otherwise. In the context of the invention, there is no particular reason for any such limitation.

One or more portions of the method 200 are sometimes described as being performed by particular elements of the system 100 described with respect to FIG. 1, or sometimes by "the method" itself. When a flow point or method step is described as being performed by "the method," it can be performed by one or more of those elements, by one or more portions of those elements, by an element not described with respect to the figure, by a combination or conjunction thereof, or otherwise.

General Process

A general process can include steps such as the following:

A method such as described in the Incorporated Disclosures, in particular Harris I, can be performed to generate a calculation map. The calculation map can include a set of non-leaf nodes (sometimes called "root" nodes herein), that is, nodes whose value is responsive to a rule applied to values maintained by the complex system. The outputs of leaf or other non-leaf nodes used by a non-leaf node are sometimes referred to herein as "drivers" for that node. The set of root nodes can be disposed in a list, such as a list generally corresponding to an order in which they might be calculated.

Each root node in the root node list can be processed in order, which processing can include (1) adding the node to an empty queue; (2) reviewing the node to determine if its rule is a "link to self," as described herein, in which the value of the node is responsive to a value of the same node, but from an earlier time period or from the same time period [nodes needed for those calculations can also be included in the queue of "link to self" nodes];

A queue, such as the root node list, can be processed as follows: (1) a next calculation node [sometimes referred to as a "CalcNode"] can be removed from the head of the queue, and added to the end of the list of nodes to be calculated [sometimes referred to as a "CalculationList"]; (2) a list of driver nodes, as described herein, can be added to the queue, if not already in that queue, and if not themselves root nodes.

This process can have the effect of generating a list of nodes to be calculated, which can include all the nodes to be calculated for the complex system. In one embodiment, the list of nodes to be calculated can have each node therein calculated by repeatedly sequencing through the list of nodes to be calculated, until all such nodes have been evaluated. In one embodiment, when a first node and a second node have a relationship in which the second node's value depends on the first node's value (sometimes called a "driver-dependent" relationship), the "driver" should be placed before the "dependent" in the list of nodes to be calculated. This can have the effect that fewer calculations must wait until other nodes' values are determined.

In one embodiment, it is generally assumed that this ordering can be subject to sub-optimal orderings at times, with the effect that multiple passes through the list of nodes to be calculated might be involved. In such cases, after a threshold number of passes through the list of nodes to be calculated (this threshold can be a single pass), the list of nodes to be calculated can be reversed, with the effect that (hopefully) a number of inverted dependencies can be reduced. In one embodiment, the list of nodes to be calculated can be reversed multiple times, once for each time the threshold is exceeded.

FIG. 2A

FIG. 2A shows a conceptual drawing of a first method.

A flow point 200A, labeled "optimal ordering," indicates a beginning of the first method 200. At this flow point, the first method 200 can initialize variables and reset/set state, as appropriate.

At a step 211, labeled "get next root node," the first method 200 selects the next node in the complex system, which node is a "root node," that is, "a CalcNode for a set of RootValues," as described herein, a node whose value is responsive to a rule applied to those values.

At a step 212, labeled "handle link to self," the first method 200 performs the second method 250, as described herein with respect to the FIG. 2B.

At a step 213, labeled "start queue scan," the first method 200 reviews the Driver Node Queue (DNQ), searching for the next queued node.

At a step 214, labeled "get next queued node," the first method 200 selects the next queued node from the DNQ.

At a step 215, labeled "add to calculation list," the first method 200 adds the selected node to the Calculation List (the initial ordering of all nodes in the calculation graph).

At a step 216, labeled "next node driver," the first method 200 steps to the next "driver" of the selected DNQ node (the actual and adds that driver at the step 219 described below), that is, each node whose value the selected node depends upon. For example, if a node A=BC, the values for B and C are considered drivers for the node A At a step 217, labeled "driver has drivers?", the first method 200 determines if the driver node itself has further drivers. In the example described with respect to the just-previous step 216, if the node B has drivers, such as if B is a value controlled by a rule such as $B=D^2+E^2$, then B itself also has drivers, and the question "driver has drivers?" is answered in the affirmative. If not, the first method 200 continues with the just-previous step 216. If so, the first method 200 continues with the next step 218.

At a step 218, labeled "driver in queue?", the first method 200 determines if the driver node is in already in the DNQ. If not, the first method 200 continues with the step 219, "add to queue," where it adds that driver node to the queue. If so, the first method 200 continues with the step 220.

At a step 220, labeled "more drivers?", the first method 200 determines if there are any further driver nodes (of the node from the earlier step 216). If yes, the first method 200 continues with the earlier step 216. If not, the first method 200 continues with the next step 221.

At a step 221, labeled "queue empty?", the first method 200 determines if the DNQ is empty. If no, the first method 200 continues with the earlier step 213. If yes, the first method 200 continues with the next step 222.

At a step 222, labeled "more roots?", the first method 200 determines if there are any further root nodes, such as described above with respect to the earlier step 211. If yes, the first method 200 continues with the earlier step 211. If no, the first method 200 continues with the flow point 200B, where the first method 200 is complete.

FIG. 2B

FIG. 2B shows a conceptual drawing of a second method. More specifically, FIG. 2B shows a conceptual drawing of a second method 212, a portion of the first method described with respect to the FIG. 2A at the element 212.

A flow point 230A, labeled "handle link to self," indicates a beginning of the second method 212. At this flow point, the second method 212 can initialize variables and reset/set state, as appropriate.

At a step 231, labeled "create empty list," the second method 212 creates an empty list, that can be used by other steps in the method 212.

At a step 232, labeled "link to self node?," the second method 212 determines whether a node under examination depends upon itself. For example, if a node A=AB, the value A depends upon its own value, with the effect that the value A has a link to itself, and the second method 212 selects the link from the value A back to itself.

At a step 233, also labeled "get next driver," the second method 212 selects a next driver value, should one exist.

At a step 234, labeled "add to queue," the second method 212 adds all "driver value" nodes to the DNQ of such "driver value" nodes.

At a step 235, labeled "more nodes?" the second method 212 determines whether there are any further nodes under examination. If the second method 212 determines that there are in fact more such nodes, it proceeds with the earlier step 232, where it determines if the next of those further nodes if a "link to self" node. If the second method 212 determines that there are no more such nodes, it continues with the step 236, at which the second method 212 returns the list it has compiled and the second method 212 is complete.

At a step 236, labeled "return list," the second method 212 returns the list it has compiled and the second method 212 is complete.

FIG. 2C

FIG. 2C shows a conceptual drawing of a third method.

FIG. 2C shows a conceptual drawing of a portion of a cyclic graph included in a complex system. For example, the portion of the cyclic graph can represent values, variables, and rules (such as calculations) linking those variables and values.

A portion of a cyclic graph 200 includes a first node A 210, a second node B 220, and a third node C 230, each of which can represent any type of element in the cyclic graph 200.

The first node A 210 and the third node C 230 can include a link 1 coupling those two nodes.

The first node A 210 and the second node B 220 can include a link 2 coupling those two nodes.

The second node B 220 and the third node C 230 can include a link 3 coupling those two nodes.

Operation of the system 100 with respect to the first node A 210, the second node B 220, and the third node C 230, and the links 1, 2, and 3, there-between, can operate as described herein with respect to the system 100.

Alternative Embodiments

While this application is primarily described with respect to complex modeling solutions relating to financial planning, in the context of the invention, there is no particular requirement for any such limitation. For example, the techniques (including machines, methods, articles of manufacture, and compositions of matter) can be applied to systems that operate on physical substances, such as chemical refineries or rubber-curing devices; systems that operate on combinations of physical systems and information processing, or on combinations of information processing and computation, such as signal-processing systems, such as EKG measurement, analysis, diagnosis, stabilization, and control systems; such as computing techniques, such as relatively rapid multiplication or factoring of large numbers, or predictive systems, such as expert inference systems, case-based reasoning systems, Bayesian reasoning systems, Monte Carlo search systems, or otherwise. As noted above, similarly, the applicability of the techniques shown herein can broadly encompass a wide variety of models for complex systems, including feedback and feed-forward modeling, machine learning techniques, parallel computation and other resource contention techniques, Navier-Stokes relaxation, supply-and-demand curve responses to changes in taxes or transaction costs; or otherwise.

After reading this application, those skilled in the art would recognize that these machines, methods, articles of manufacture, and compositions of matter, are within the scope and spirit of the invention, and would be workable using the description herein without undue experimentation or further invention.

Similar Elements or Steps

Individual elements or method steps of the described embodiments could be replaced with substitutes that perform similar functions in other contexts.

Elements of the system are described herein with respect to one or more possible embodiments, and are not intended to be limiting in any way. In the context of the invention, there is the particular requirement for any such limitations as described with respect to any elements of the system. For one example, individual elements of the described apparatuses could be replaced with substitutes that perform similar functions. Moreover, as described herein, many individual elements of the described apparatuses are optional, and are not required for operation.

Moreover, although control elements of the one or more described apparatuses are described herein as being executed as if on a single computing device, in the context of the invention, there is no particular requirement for any such limitation. For one example, the control elements of the one or more described apparatuses can include more than one computing device (or more than one specialized computing device), not necessarily all similar, on which the element's functions are performed.

For one example, while some embodiments are generally described herein with respect to specific steps to be performed by generalized computing devices, in the context of the invention, there is no particular requirement for any such limitation. In such cases, subject matter embodying the invention can include special-purpose devices; and can include special-purpose hardware devices having the elements described herein, and having the effect of performing the steps described herein; and combinations or conjunctions thereof. Embodiments of the invention are not necessarily limited to computing devices, but can also include any form of device or method that can improve techniques for improving the effect of the machine operations described herein.

In one particular implementation, instructions capable of being interpreted for control of devices can be provided as a computer program product, such as instructions that are maintained on a computer-readable storage medium or a non-transitory machine-readable medium. The non-transitory medium can include a magnetic, optical or magneto-optical storage medium; a flash storage medium; or otherwise.

Specification not Limiting

After reading this Application, those skilled in the art would recognize that the invention is not limited to only the specifically described embodiments, that many variations are within the scope and spirit of the invention, and would be workable without undue experiment or further invention.

The Claims in this Application are hereby included by reference in the text of the Specification.

The invention claimed is:

1. A method including, at a processor:
   collecting a system model into a memory, the system model including inputs, variables, values that the variables can have, and rules, each rule specifying one or more of a computation to be performed and a conditional statement to be evaluated in response to the variables;
   providing a directed graph including both leaf nodes and root nodes, each leaf
   node specifying one or more of an input or a parameter of the model, and each root node specifying rules and variables whose values are operated upon by the root nodes, with edges of the directed graph representing a driver relationship such that a driver node is a node whose output is used by another node;

disposing the root nodes in a first list; and transferring the root nodes from the first list onto an order-of-performance list which is ordered in an order in which the root nodes are to be performed comprising:
- (a) when a first root node on the first list does not have itself as a driver, allocating a corresponding queue for the root node and moving that root node to the corresponding queue;
- (b) when the first root node on the first list has itself as a driver, moving that first root node to one or more of a last position on the first list or a self-linking queue;
- (c) when the corresponding queue is not empty, and a first node in that queue has nodes with all of its drivers already on the order-of-performance list, moving that first node to a last position on that order-of-performance list; and
- (d) when a queue is not empty, and the first node in that queue has nodes with one or more of its driver nodes not yet on the order-of-performance list, moving that first node to a last position on its queue, and moving one or more driver nodes for that first node onto that queue, so long as those driver nodes are not themselves root nodes;

outputting the order-of-performance list which is ordered in an order in which the root nodes are to be performed.

2. The method as in claim 1, including the steps of:

presenting a representation of the graph to a user, the representation including one or more of a display of nodes associated with the rules and a display of links showing direction of changes from input to output;

receiving instructions from the user, those instructions from the user including one or more of zooming in for a more detailed view of the model and zooming out for a more global view of the model.

3. The method as in claim 2, including, when the only nodes not yet on the order-of-performance list are either on the self-linking queue or have drivers thereon, requesting assistance from the user and responding thereto.

4. The method as in claim 1, including repeating the steps of transferring root nodes from the first list onto the order-of-performance list until all nodes are on the order-of-performance list.

5. The method as in claim 1, including the steps of:
when the steps of transferring root nodes from the first list onto the order-of-performance list have been performed at least a specified number of times, reversing the first list; and performing the steps of transferring root nodes from the first list onto the order-of-performance list after the steps of reversing.

6. The method as in claim 5, including the steps of performing those steps of reversing the first list and re-performing the steps of transferring root nodes a plurality of times.

7. The method as in claim 6, wherein that plurality of times is no more than a specified threshold.

8. The method as in claim 5, wherein the specified number of times is once.

9. The method as in claim 1, including the steps of:
when the steps of transferring root nodes from the first list onto the order-of-performance list have been performed at least a specified number of times, performing a reordering transform on the first list whereby one or more dependencies on said first list are reduced with high probability; and performing the steps of transferring root nodes from the first list after performing the reordering transform.

10. The method as in claim 2, wherein presenting the representation further includes one or more of aggregating nodes collected into single nodes and aggregating links collected into single links.

11. The method as in claim 1, wherein the first list is sorted in an order in which the root nodes are to be performed.

12. The method as in claim 1, wherein the model's rules include one or more of calculating one or more output values or variables in response to one or more input values or variables, comparing one or more input values or variables with a threshold value or variable, and conditionally performing an operation.

13. The method as in claim 1, wherein, when the only nodes not yet on the order-of-performance list are either on the self-linking queue or have drivers thereon, moving a first root node from the self-linking queue to the order-of-performance list and continuing the steps of transferring root nodes from the first list.

14. The method as in claim 1, wherein when the steps of transferring root nodes from the first list have no nodes to move to the order-of-performance list, the only nodes not yet on the order-of-performance list are either on the self-linking queue or have drivers thereon.

* * * * *